United States Patent
Grobe et al.

(10) Patent No.: US 9,135,957 B2
(45) Date of Patent: Sep. 15, 2015

(54) ELECTRONIC STORAGE DEVICE MOUNTS

(75) Inventors: Gavin Q. Grobe, Boise, ID (US); Jeff D. Hall, Meridian, ID (US)

(73) Assignee: HEWLETT-PACKARD DEVELOPMENT COMPANY, L.P., Houston, TX (US)

( * ) Notice: Subject to any disclaimer, the term of this patent is extended or adjusted under 35 U.S.C. 154(b) by 567 days.

(21) Appl. No.: 13/040,105

(22) Filed: Mar. 3, 2011

(65) Prior Publication Data

US 2012/0223198 A1     Sep. 6, 2012

(51) Int. Cl.
G11B 33/02     (2006.01)
G11B 33/12     (2006.01)
G06F 1/18      (2006.01)

(52) U.S. Cl.
CPC .............. *G11B 33/124* (2013.01); *G06F 1/187* (2013.01); *Y10T 29/49002* (2015.01)

(58) Field of Classification Search
CPC .. G11B 33/124; G11B 33/128; G11B 33/127; H05K 7/12; G06F 1/184; G06F 1/187
USPC ............ 248/225.21, 222.11, 229.16, 229.26, 248/222.51, 221.11; 24/458, 191; 361/679.33–679.39, 679.31, 759, 726, 361/679.32, 679.41, 679.58, 760, 752, 695; 312/223.2, 215, 222, 332.1, 333, 312/223.1; 403/322.4, 330; 292/80, 95, 292/113, 106, 137, 143, 150, 302, DIG. 11, 292/DIG. 37, DIG. 53, DIG. 63, DIG. 64, 292/303, 84, DIG. 38, 81–83, 109–110, 292/200, 99, 85, 87; 720/657; 211/192
See application file for complete search history.

(56) References Cited

U.S. PATENT DOCUMENTS

| | | | |
|---|---|---|---|
| 2,609,268 A * | 9/1952 | Nye | 312/332.1 |
| 4,896,777 A | 1/1990 | Lewis | |
| 5,398,157 A * | 3/1995 | Paul | 361/679.31 |
| 5,608,603 A * | 3/1997 | Su | 361/679.08 |
| 5,680,293 A | 10/1997 | McAnally et al. | |
| 5,734,557 A * | 3/1998 | McAnally et al. | 361/727 |
| 5,921,644 A * | 7/1999 | Brunel et al. | 312/223.2 |
| 5,950,973 A * | 9/1999 | Verma | 248/222.51 |
| 6,231,145 B1 | 5/2001 | Liu | |
| 6,262,883 B1 * | 7/2001 | Kim | 361/679.09 |
| 6,362,416 B1 * | 3/2002 | Denny et al. | 174/365 |
| 6,505,899 B1 * | 1/2003 | Jetter | 312/223.1 |
| 6,515,854 B1 * | 2/2003 | Claprood | 361/679.33 |
| 6,914,778 B2 * | 7/2005 | Deckers et al. | 361/679.32 |
| 7,148,418 B2 * | 12/2006 | Ku et al. | 361/752 |
| 7,262,958 B2 * | 8/2007 | Marroquin et al. | 361/679.33 |
| 7,379,294 B2 | 5/2008 | Chen | |
| 7,571,884 B2 | 8/2009 | Chen et al. | |

(Continued)

*Primary Examiner* — Ingrid M Weinhold
(74) *Attorney, Agent, or Firm* — Van Cott, Bagley, Cornwall & McCarthy (57) ABSTRACT

In one example, a mounting device includes a single piece screwless cradle for mounting an electronic storage device to a mounting plane. A method for tool-less installation of an electronic storage device is also provided. The method includes placing an electronic storage device into a single piece screwless cradle and pressing engagement features of the cradle into receptive features of the electronic storage device to join the cradle to the electronic storage device. The cradle and electronic storage device are slid over a mounting plane such the electronic storage device is disposed on a first surface of the mounting plane and an arm of the cradle is disposed on an opposite second surface of the mounting plane.

18 Claims, 8 Drawing Sheets

(56) References Cited

U.S. PATENT DOCUMENTS

| | | | |
|---|---|---|---|
| 7,755,887 B2* | 7/2010 | Chen et al. | 361/679.33 |
| 8,020,902 B1* | 9/2011 | Li | 292/80 |
| 8,136,849 B2* | 3/2012 | Hakemann | 292/95 |
| 8,159,817 B2* | 4/2012 | Lin et al. | 361/679.39 |
| 2005/0081224 A1* | 4/2005 | Hsu | 720/657 |
| 2006/0023413 A1* | 2/2006 | Lo et al. | 361/684 |
| 2007/0211422 A1 | 9/2007 | Liu et al. | |
| 2008/0144274 A1* | 6/2008 | Chen et al. | 361/685 |
| 2008/0158810 A1* | 7/2008 | Liu et al. | 361/685 |
| 2008/0239651 A1* | 10/2008 | Curnalia et al. | 361/685 |
| 2009/0161308 A1* | 6/2009 | Chen et al. | 361/679.33 |
| 2011/0069441 A1* | 3/2011 | Killen et al. | 361/679.33 |

* cited by examiner

ELECTRONIC STORAGE DEVICE MOUNTS

BACKGROUND

Hard drives are non-volatile random access electronic storage devices used by computing devices to store and retrieve digital data. Hard drives are mounted within the computing devices using multiple components. For example, hard drives may be mounted using screws, rails, sheet metal cages, and other components. Hard drives may also be mounted away from the printed circuit boards and use a cable connection to provide communication and power to the hard drive. Cabling to a hard drive also presents significant signal integrity challenges, which can be overcome by direct PCA connection. The complexity of the mounting structures can significantly increase the size and cost of the computing device. Additionally, installing or replacing a hard drive may involve a significant amount of time, specialized knowledge, and the use of tools.

BRIEF DESCRIPTION OF THE DRAWINGS

The accompanying drawings illustrate various examples of the principles described herein and are a part of the specification. The illustrated examples are merely examples and do not limit the scope of the claims.

Throughout the drawings, identical reference numbers designate similar, but not necessarily identical, elements.

DETAILED DESCRIPTION

Hard drives are typically mounted using screws, rails, sheet metal cages, and other components. The hard drives may also be mounted away from the printed circuit boards and use a cable connection to provide communication and power to the hard drive. The complexity of the mounting structures can significantly increase the size and cost of the computing device. Additionally, to install or replace a hard drive may involve partial disassembly of the computing device, specialized knowledge, and the use of tools.

In many computing devices, it may be desirable to simplify the hard drive mounting. Ideally, a hard drive mount would be inexpensive and be designed for installation without tools or specialized knowledge. Additionally, the hard mount would have a small footprint and be designed to directly interface to a connector on a printed circuit assembly. This can allow tighter spacing of adjoining components within the computing device and improved airflow through the computing device. The direct connection of the drive to the printed circuit assembly eliminates cabling and its associated cost.

In the following description, for purposes of explanation, numerous specific details are set forth in order to provide a thorough understanding of the present systems and methods. It will be apparent, however, to one skilled in the art that the present apparatus, systems and methods may be practiced without these specific details. Reference in the specification to "an example" or similar language means that a particular feature, structure, or characteristic described in connection with the example is included in at least that one example, but not necessarily in other examples.

As used in the specification and appended claims, the term "hard drive" refers broadly to electronic storage devices. For example, a hard drive may be based on a variety of technologies including rotating rigid platters that magnetically store data, tape drives, flash technology, battery backed DRAM drives, or other solid state drives. The term "hard drive" in not limited to a specific form factor.

Figure 1A:
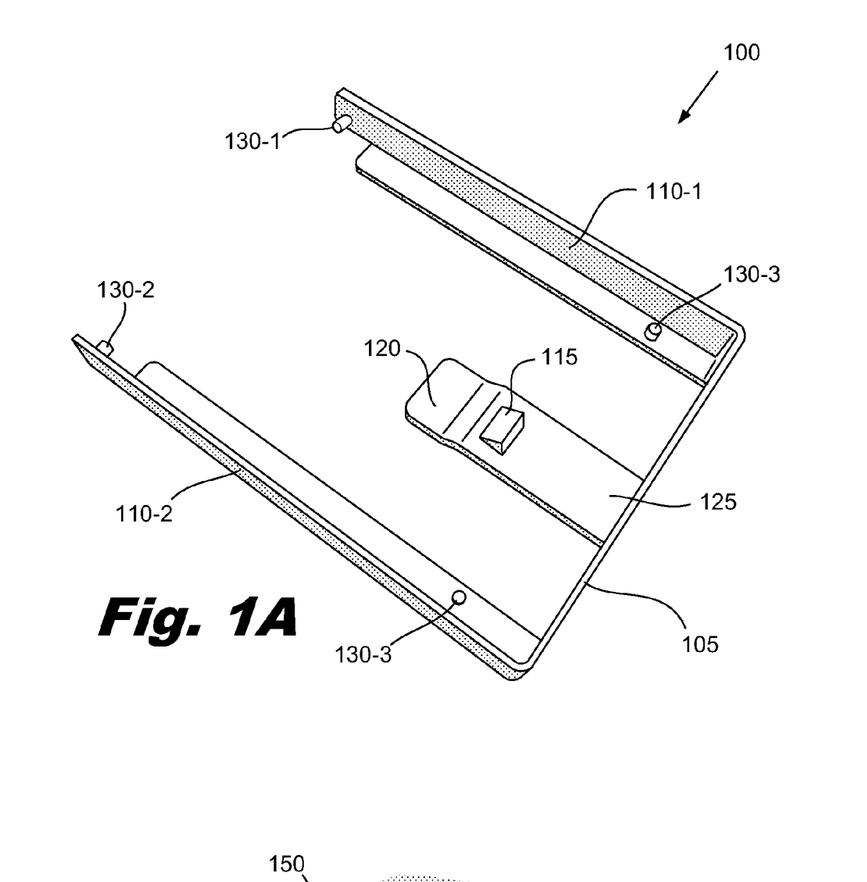
FIG. 1A is a perspective view of an illustrative single piece screwless cradle for mounting a hard drive directly to a printed circuit assembly, according to one example of principles described herein.

FIG. 1A is a perspective view of an illustrative single piece screwless cradle (100) for mounting a hard drive directly to a printed circuit assembly. The cradle (100) includes two rails (110-1, 110-2) that are connected by a crossbar (105) to form a "U" shape. An arm (125) extends from the center of the crossbar (105). A hook (115) extends upward from the arm (125). The hook (115) is designed to latch into an aperture in a mounting plane. The arm (125) terminates in a finger release tab (120).

Four pins (130) on the rails (110) engage with mounting features on a hard drive. In one implementation, the pins (130) are designed to have a light press fit with threaded mounting holes in the hard drive. The press fit tolerances can be selected such that finger pressure is sufficient to press the pins (130) into the threaded mounting holes.

Figure 1B:
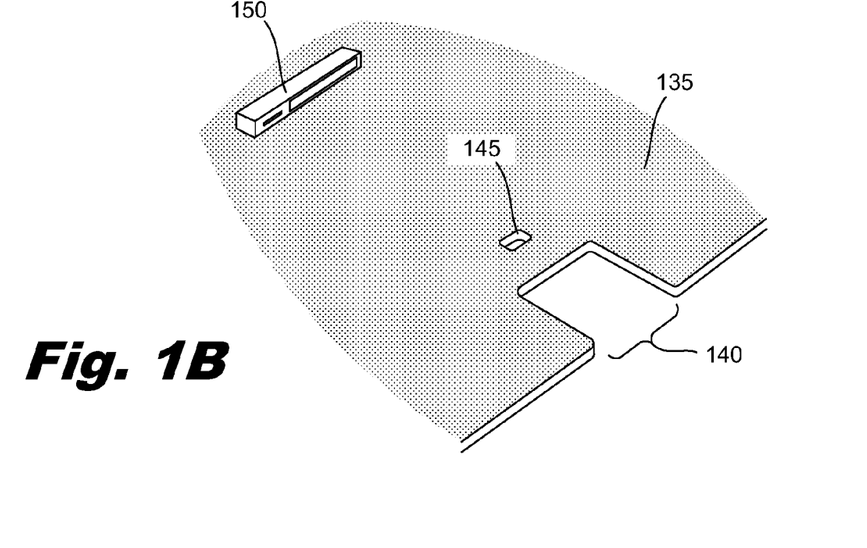
FIG. 1B is a perspective view of an illustrative printed circuit assembly that mates with a single piece screwless cradle and hard drive, according to one example of principles described herein.

FIG. 1B is a perspective view of an illustrative printed circuit assembly (135) that is configured to mate with a single piece screwless cradle (100, FIG. 1A) and a hard drive. The printed circuit assembly (135) includes a board mounted electrical connector (150). The board mounted electrical connector (150) is directly mounted to the printed circuit assembly (135). The printed circuit assembly (135) also includes a slot (140) and a hook aperture (145).

To mount a hard drive to the printed circuit assembly (135), the hard drive is first mounted to the cradle (100) by flexing the rails (110) open and placing the hard drive between the rails (110). The horizontal pins (130-1, 130-2) are inserted into the matching threaded holes on the side of the hard drive. Moderate finger pressure can then be used to press the horizontal pins (130-1, 130-2) to their full depth in the threaded holes. The hard drive is then rotated into contact with the vertical pins (130-3, 130-4) which are pressed into the matching threaded holes on the bottom of the hard drive. This secures the cradle (100) to the hard drive. The cradle (100) is then slipped over the printed circuit assembly (135) with the hard drive and rails (110) on the connector side of the printed circuit assembly (135) and the arm (125) on the opposite side of the printed circuit assembly. The hard drive and cradle then slide down the slot (140) until an electrical connection is made between the hard drive and the board mounted electrical connector (150). When the electrical connection is complete, the hook (115) engages the hook aperture (145) to secure the hard drive in place and prevent the hard drive from backing out of the connector. The combination of the arm/slot connection, hook/hook aperture connection, and electrical connection secure the hard drive in place on the printed circuit assembly (135) or other mounting plane. The installation process is further described below.

Figure 2:
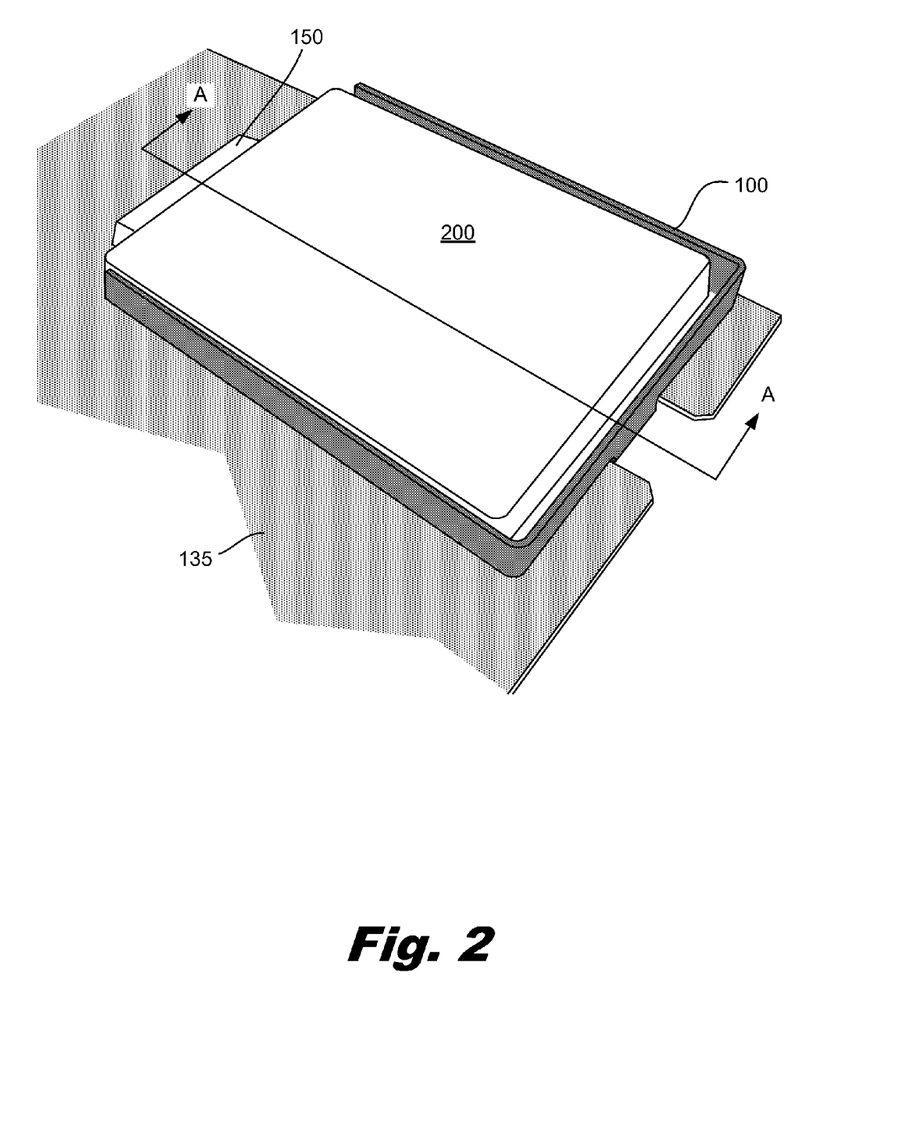
FIG. 2 is a perspective view of a hard drive mounted to a printed circuit assembly using an illustrative single piece screwless cradle, according to one example of principles described herein.

FIG. 2 is a perspective view of a hard drive (200) mounted to a printed circuit assembly (135) using an illustrative cradle (100). As discussed above, the hard drive (200) electrically interfaces with the board mounted electrical connector (150) that is mounted to the print circuit assembly (135). This particular cradle implementation has a very low profile. No part of the cradle (100) extends above the upper surface of the hard drive (200). Additionally, the cradle (100) has a very minimal footprint on the printed circuit assembly (135). The arm (125, FIG. 1A) extends to the opposite side of the printed circuit assembly secures the cradle and hard drive to the printed circuit assembly (135). The arm (125, FIG. 1A) interfaces with a portion of the printed circuit assembly area (135) under the hard drive (200) to minimize the board space needed for retention features.

Figure 3A:
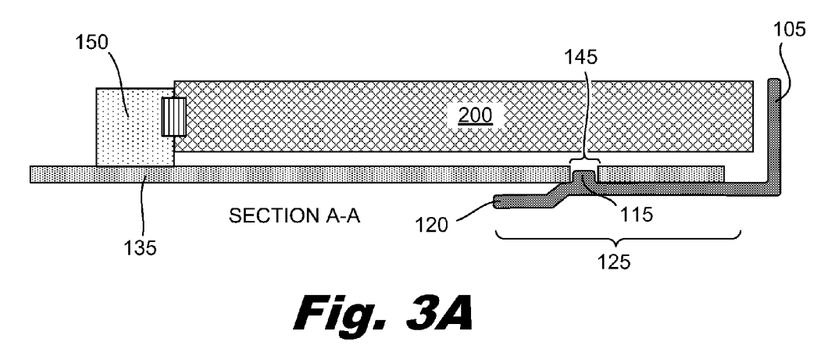
FIG. 3A is a cross sectional view of a hard drive mounted to a printed circuit assembly using an illustrative single piece screwless cradle, according to one example of principles described herein.

FIG. 3A is a cross sectional view of a hard drive (200) mounted to a printed circuit assembly (135) using an illustrative single piece screwless cradle (100). The cross section is taken along line A-A in FIG. 2 which passes through the center of the hard drive (200) and hook (115). In this implementation, the hard drive (200) is secured by pins (130, FIG. 1A) on the rails (110, FIG. 1A). As discussed above, the arm (125) includes a finger release tab (120) and hook (115). In this example, the hook (115) directly interfaces with an aperture (145) in the printed circuit assembly (135).

Figure 3B:
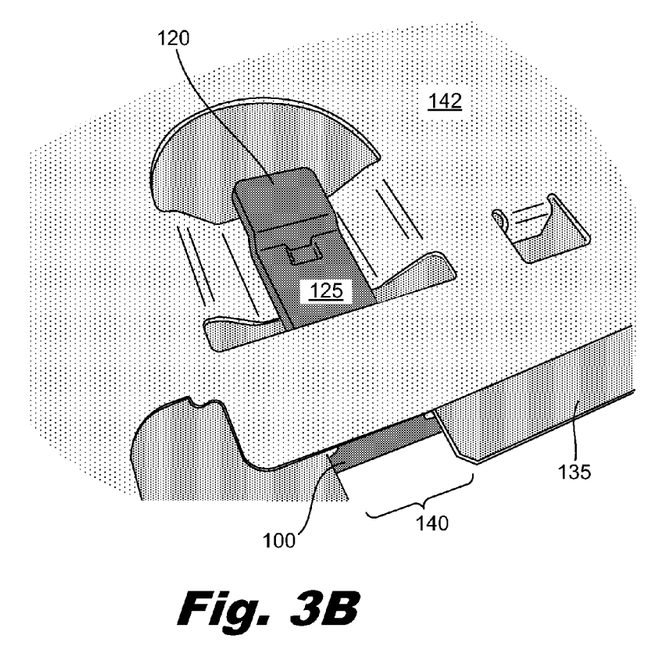
FIG. 3B is a perspective view of an arm of an illustrative single piece screwless cradle that engages a sheet metal form, according to one example of principles described herein.

FIG. 3B is a perspective view of the bottom of an illustrative printed circuit assembly (135) that is supported by a shaped sheet metal plate (142). The arm (125) of the cradle (100) engages directly with the sheet metal (142). The sheet metal (142) has an aperture that the hook (115, FIG. 3A) engages. In some implementations, the hook (115, FIG. 3A) may pass through the aperture in the sheet metal (142) and engage a matching hook aperture (145) in the printed circuit assembly (135).

To remove the hard drive (200) and cradle (100) from the printed circuit assembly (135), a user places a finger under the finger release tab (120) and lifts. This causes the arm (125) to deflect and raises the hook (115, FIG. 3A) out of the hook aperture (145). The cradle and drive (200, FIG. 3A) can then be slid back out of the slot (140) to disengage the drive (200, FIG. 3A) from the board mounted electrical connector (150). The cradle (100) and drive (200, FIG. 3A) are then separate from the printed circuit assembly (135). If desired, the cradle (100) can be removed from the drive (200, FIG. 3A) by pulling the pins (130, FIG. 1A) from the threaded holes of the drive (200, FIG. 3A). A new drive can then be connected to the cradle and mounted to the printed circuit assembly (135). Alternatively, a new cradle can be used to mount the new drive.

The use of a single piece screwless cradle to mount a hard drive directly to a printed circuit assembly has a number of advantages. The single piece screwless cradle can be less expensive to manufacture and maintain in inventory than other multi-piece mounting designs. The cradle and drive assembly has a small footprint and does not extend higher than the drive's upper surface. This can allow for tighter spacing of adjoining components within a computing device and improved airflow through the computing device.

Additionally, the connection between the cradle and the printed circuit assembly is uncomplicated and direct. The direct electrical connection of the drive to the printed circuit assembly eliminates cabling and its associated cost and space. Cabling to a hard drive also presents significant signal integrity challenges, which can be overcome by direct PCA connection. The arm attaches over the printed circuit assembly and latches onto the opposite side of the printed circuit assembly. This efficiently uses the space under the hard drive to secure the hard drive to the printed circuit assembly. Removal of the drive from the printed circuit assembly is also accomplished without tools. As discussed above, the finger release tab on the back side of the printed circuit assembly can be raised manually and the hard drive backed out of the slot. This tool-less installation and removal of the hard drive allows the procedure to be performed by users without special equipment.

As used in the specification and appended claims, the term "mounting plane" refers to any geometrical form which has a first side that contacts the rails of the single piece screwless cradle and a second opposing side that contacts the arm. The mounting plane could be formed from a variety of materials and have a variety of geometries. For example, the mounting plane could be a printed circuit board, a plane of a plastic box, piece of sheet metal or other suitable geometrical form. Additionally, the mounting plane is not strictly limited to planar geometries. The mounting plane may have indentations and/or curvature in one or more dimensions.

Figure 4A:
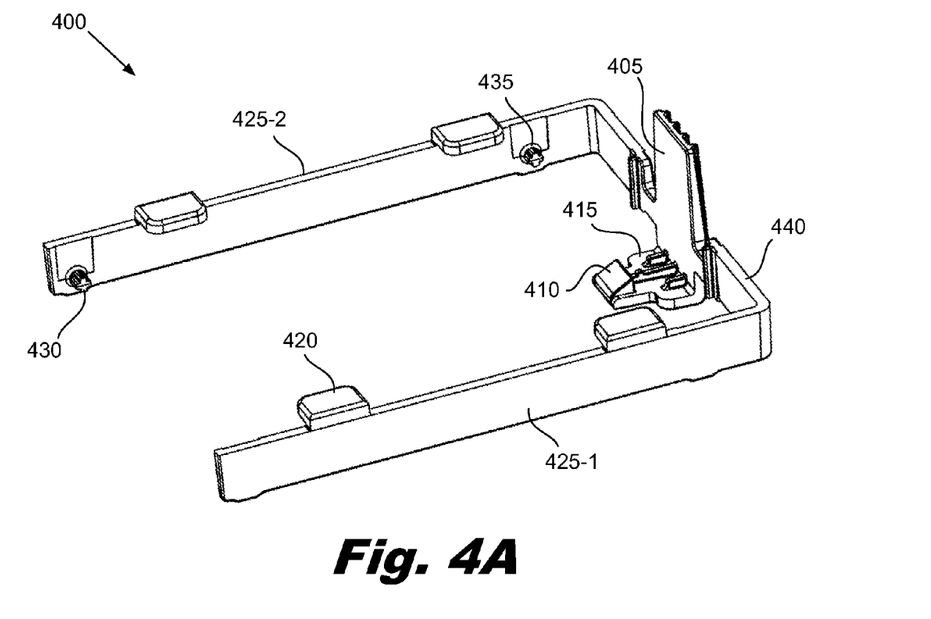
FIGS. 4A and 4B are a perspective view and a side view, respectively, of an illustrative single piece screwless cradle for mounting a hard drive directly to a printed circuit assembly, according to one example of principles described herein.
Figure 4B:
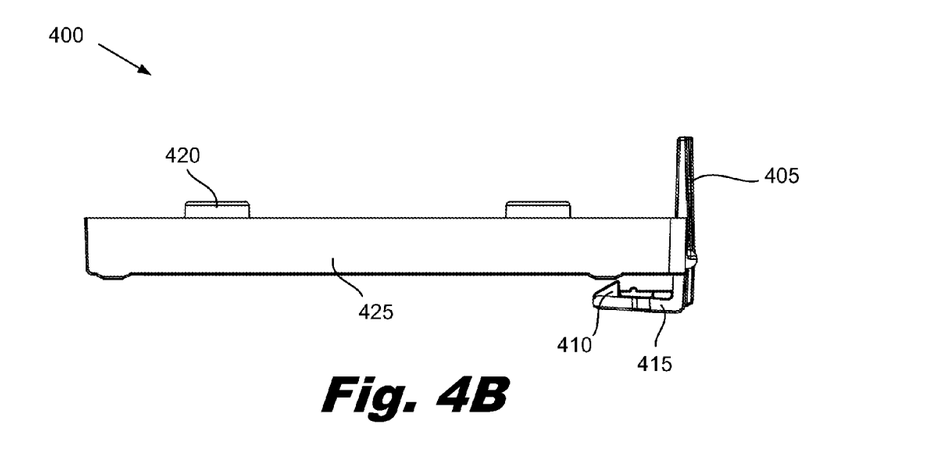

In some implementations, the user may not have access to the back side of the mounting plane to lift a finger release tab near the hook. FIGS. 4A and 4B are a perspective view and a side view, respectively, of an illustrative cradle (400) that incorporates a finger release tab (405) that is accessible from the hard drive side of the mounting plane. The illustrative cradle (400) is a single piece screwless mount for securing a hard drive to a mounting plane. The cradle (400) includes two rails (425-1, 425-2) that are connected by a crossbar (440) to form a "U" shaped frame. The rails (425-1, 425-2) include long pins (430) near ends of the rails (425-1, 425-2) and shorter pins (435) near the crossbar (440). In this example, all of the pins are horizontal and extend inward toward the hard drive. The rails also include retention tabs (420) on their upper edges. The crossbar (440) includes an arm (415) with a hook (410). The motion of the hook (410) is actuated by finger pressure on the finger release tab (405).

Figure 5A:
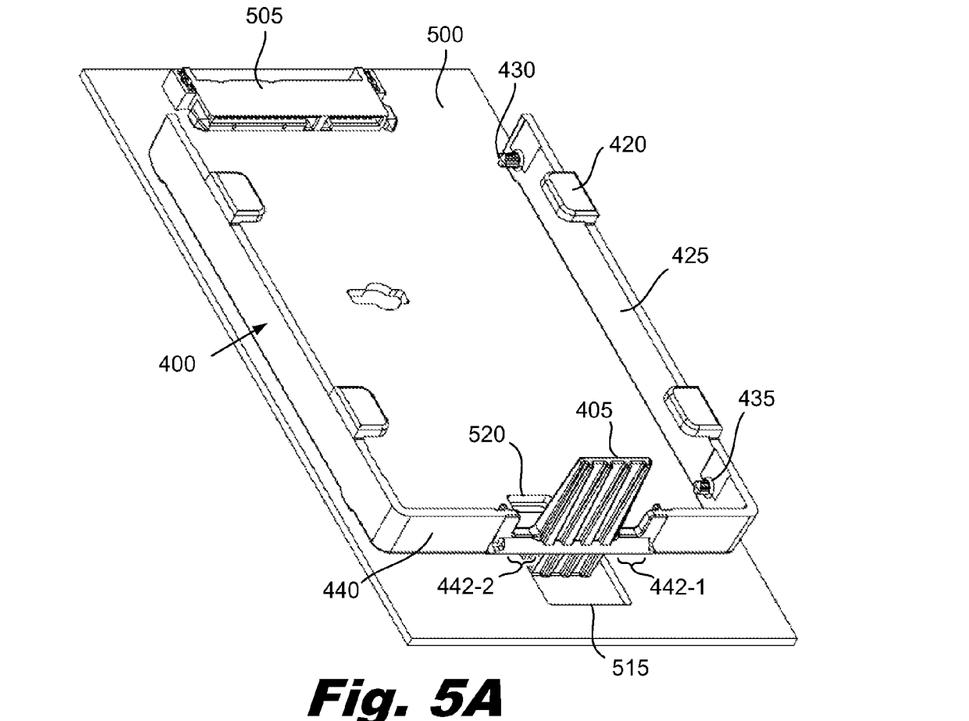
FIGS. 5A and 5B are a perspective view and a top view, respectively, of an illustrative single piece screwless cradle mounted to a printed circuit assembly, according to one example of principles described herein.
Figure 5B:
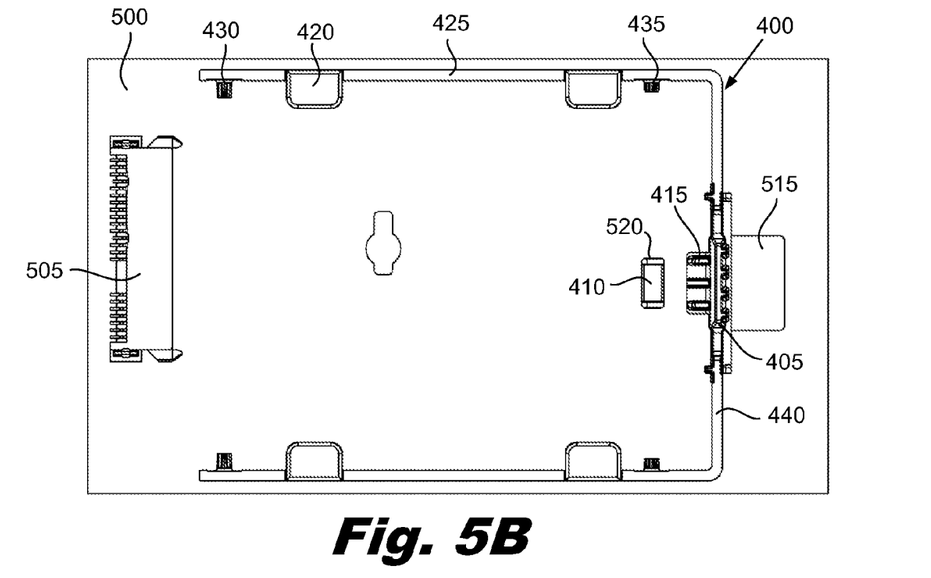

FIGS. 5A and 5B are a perspective view and a top view, respectively, of an illustrative cradle (400) mounted to a printed circuit assembly (500). For purposes of illustration, the hard drive is omitted from the assembly and only a portion of the printed circuit assembly (500) is shown. This portion of the printed circuit assembly (500) includes two apertures (515, 520) and a board mounted electrical connector (505). The first aperture (515) is a clearance hole for the arm (415) to pass through the printed circuit assembly (500). The hook (410) can then engage the hook aperture (520) from the opposite side of the printed circuit assembly (500).

The finger release tab (405) is connected to the arm (415). Pushing the finger release tab (405) toward the interior of the cradle (400) rotates the finger release tab (405) and retracts the hook (410) from the aperture (520). Two reduced cross section portions (442) are formed in the cross bar (440) on either side of the finger release tab (405). When pressure is applied to the finger release tab (405), the reduced cross section portions (442) are designed to torsionally deform to allow controlled motion of the hook (410), arm (415), and finger release tab (405). A number of ribs on the arm (415) and finger release tab (405) provide rigidity so that the finger release tab (405) and arm (415) rotate as a single unit when pressure is applied to the finger release tab (405). The ridges on the finger release tab (405) also increase friction with the user's finger.

As discussed above, the pins (430, 435) engage threaded holes on the hard drive. In this example, the pins (430, 435) extend horizontally from the rails (425-1, 425-2) to engage holes on the sides of the hard drive. The retention tabs (420) prevent gross displacement of the hard drive. To attach the cradle to the hard drive, the hard drive is inserted into the open end of the cradle and pushed toward the crossbar (440). The rails (425-1, 425-2) flex open to allow the hard drive to enter. When the threaded holes on the side of the hard drive are aligned with the pins (430, 435), the pins (430, 435) can be pressed into the threaded holes using finger pressure. The hard drive is then secured within the cradle (400).

The cradle (400) is attached to the printed circuit assembly (500) by lowering the arm (415) into the first aperture (515) until the arm (415) is on the opposite side of the printed circuit assembly (500). The cradle (400) and hard drive are then slid toward the board mounted electrical connector (505) until the electrical connection between the hard drive and the connector is made. The hook (410) snaps into the hook aperture (520) to secure the cradle (400) in place and prevent the hard drive from backing out of the board mounted electrical connector (505).

Figure 6A:
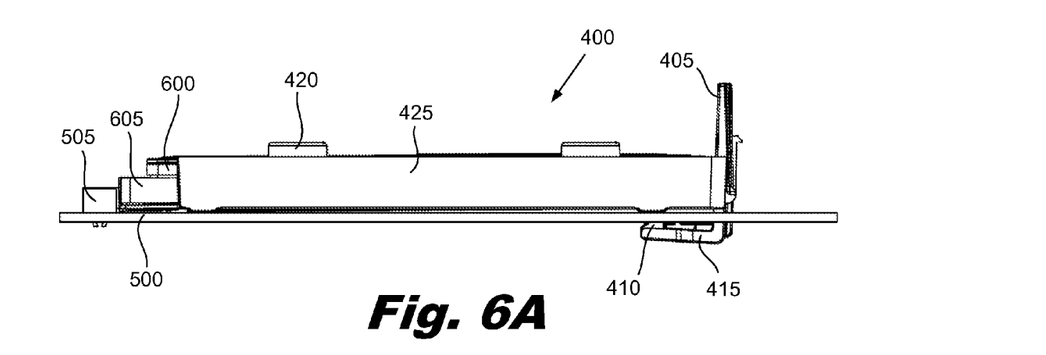
FIGS. 6A and 6B are a side view and a perspective view, respectively of a hard drive mounted with an illustrative single piece screwless cradle to a printed circuit assembly, according to one example of principles described herein.
Figure 6B:
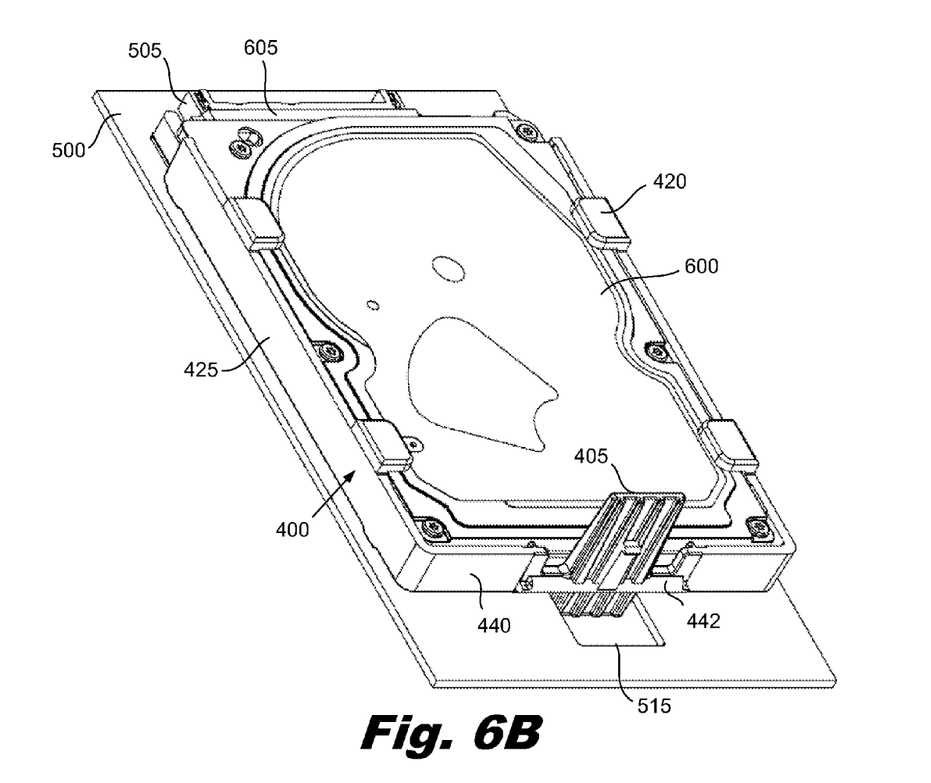

FIGS. 6A and 6B are a side view and a perspective view, respectively of hard drive (600) mounted with an illustrative cradle (400) to a printed circuit assembly (500). As shown in the figures, the hard drive (600) is surrounded on three sides by the "U" shaped cradle (400). The fourth side of the hard drive is exposed and includes the hard drive's electrical connectors (605). The hard drive's electrical connectors (605) are attached to the board mounted electrical connector (505) on the printed circuit assembly (500). According to one illustrative example, the electrical connector (505) on the printed circuit assembly may be a Serial Advanced Technology Attachment (SATA) board mount connector. However, any suitable connector that provides the desired structural support, data/power connections, footprint, and size may be used. The finger release tab (405) extends above the upper surface of the hard drive (600). This allows the hard drive to be mounted to a mounting plane without requiring accessibility to the opposite side of the mounting plane.

As discussed above, engagement features extend inward from the rails (425-1, 425-2) engage with receptive features on the hard drive. In this example, the engagement features are pins (430, 435) and the receptive features are threaded holes in the hard drive. In many instances, the locations and sizes of the threaded holes may be standardized. For example, standardized 2.5 inch hard drives have eight threaded holes at specific locations: two on each long side and four on the bottom. Other features and dimensions of the hard drives may not be standardized. For example, the thickness or overall length of the hard drives may vary. The cradle (400) can be configured to allow clearance for these variations while engaging the hard drives with press fit pins at the standardized threaded holes. Consequently, hard drives from a wide variety of manufacturers can be used with the cradle (400).

As discussed above, the tabs (420) prevent gross displacement of the hard drive (600). Ordinarily, the tabs (420) do not contact the surface of the hard drive (600). However, in the event that an extraordinary amount of force is applied to the hard drive (600), the tabs (420) retain the hard drive (600) in position.

Figure 7A:
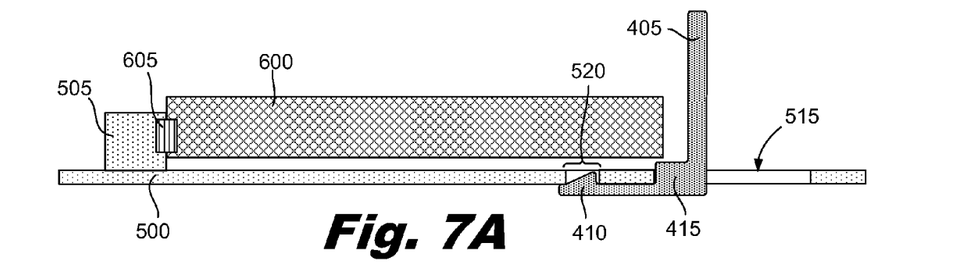
FIGS. 7A-7D are cross-sectional side views of a detachment sequence for a hard drive mounted to a print circuit assembly with an illustrative single piece screwless cradle, according to one example of principles described herein.
Figure 7B:
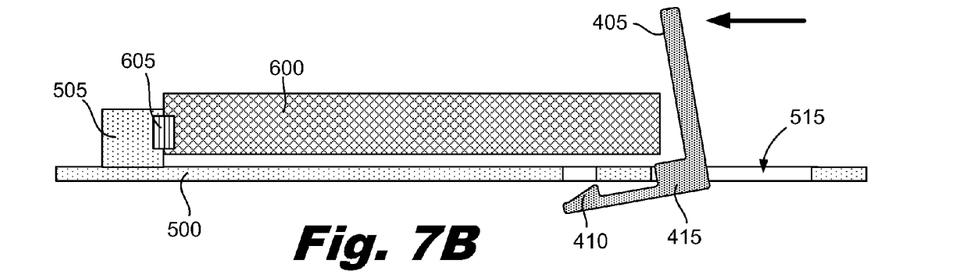

FIGS. 7A-7D are cross-sectional side views showing a detachment sequence for a hard drive (600) mounted to a print circuit assembly (500) with an illustrative cradle (400). FIG. 7A shows the hard drive (600) in its mounted and locked position on the printed circuit assembly (500). As discussed above, the printed circuit assembly (500) includes a first aperture (515), a hook aperture (520), and a board mounted electrical connector (505). The hook (410) is secured within the hook aperture (515) and the hard drive's electrical connector (605) is connected to the board mounted electrical connector (505). To remove the hard drive (600) from the printed circuit assembly (500), the finger release tab (405) is manually pressed toward the hard drive (600) as shown by the arrow in FIG. 7B. This rotates the finger release tab (405) and the arm (415) to disengage the hook (410) from the hook aperture (520).

Figure 7C:
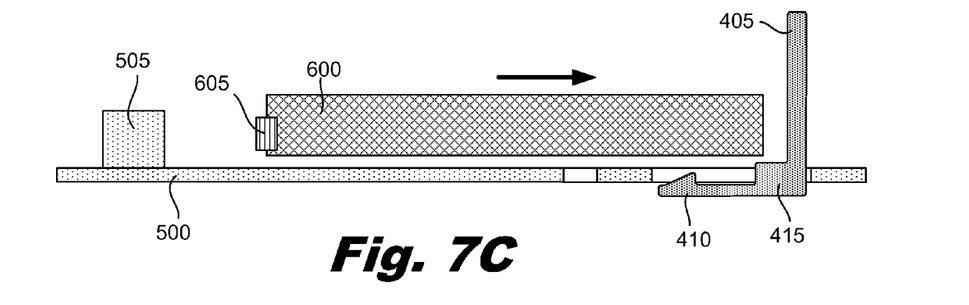
Figure 7D:
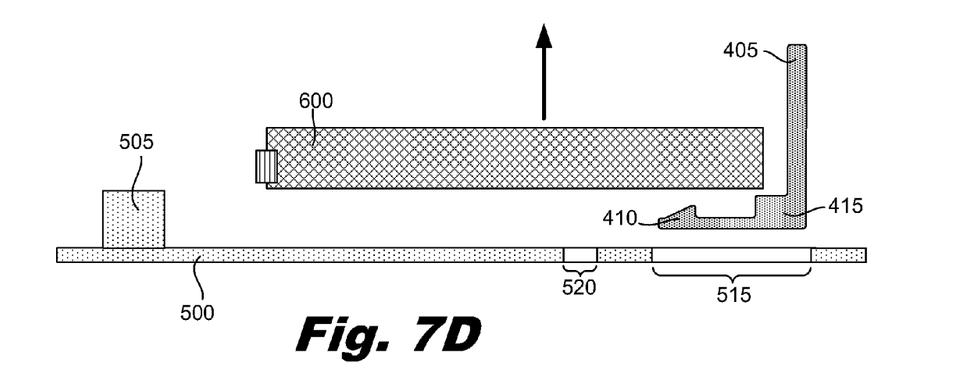

The hard (600) and cradle are then slid away from the board mounted electrical connector (505) on the printed circuit assembly (500). This disengages the hard drive (600) from the board mounted electrical connector (505) and slides the arm (415) and hook (410) back into the first aperture (515, FIG. 7B) as shown in FIG. 7C. The cradle and hard drive (600) can then be lifted away from the printed circuit assembly (500) as shown in FIG. 7D. The attachment sequence for a hard drive (600) and cradle to the printed circuit assembly (500) is the reverse of the removal sequence shown in FIGS. 7A-7D.

The cradles described above may be manufactured from using a variety of materials and techniques. For example, the cradles can be formed by machining or injection molding a polymer material.

Figure 8:
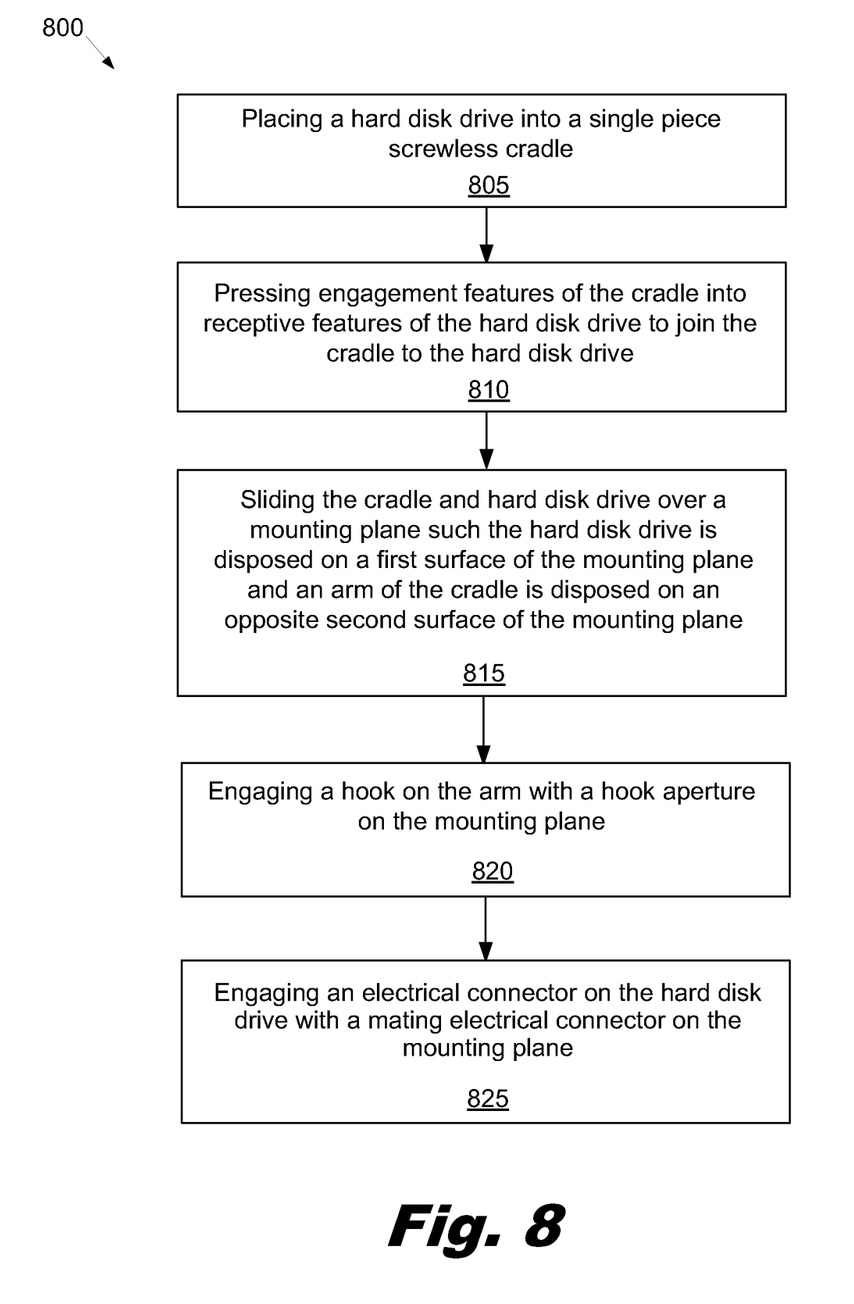
FIG. 8 is a flow chart of an illustrative method for mounting a hard drive to a printed circuit assembly with a single piece screwless cradle, according to one example of principles described herein.

FIG. 8 is a flow chart of an illustrative method for installation of a hard drive. The method includes placing a hard drive into a single piece screwless cradle (block 805). Engagement features of the cradle are pressed into receptive features of the hard drive to join the cradle to the hard drive (block 810). For example, the engagement features may be pins and the receptive features may be threaded holes. The cradle and hard drive slide over a mounting plane such the hard drive is disposed on a first surface of the mounting plane and an arm of the cradle is disposed on an opposite second surface of the mounting plane (block 815). In some implementations, sliding the cradle and hard over a mounting plane includes passing the arm through an aperture on the mounting plane to an opposite side of the mounting plane. Additionally or alternatively, sliding the cradle and hard over a mounting plane may include passing the arm down a slot in the mounting plane and over an edge of the slot to an opposite side of the mounting plane.

When the arm is on the opposite side of the mounting plane, a hook on the arm is engaged with a hook aperture on the mounting plane (block 820). An electrical connector on the hard drive engages with a mating electrical connector on the mounting plane (block 825).

The illustrative method described above may also include uninstalling a hard drive. In one implementation, the hard drive may be uninstalled by depressing a finger release tab extending above the hard drive. The finger release tab rotates to disengage a hook on the arm from a hook aperture on the mounting plane. The hard drive and cradle can then be slid away from the mounting plane. Alternatively, the hard drive may be uninstalled by lifting a finger release tab disposed on an end of the arm to lift a hook on the arm from a hook aperture on the mounting plane and sliding the hard drive and cradle away from the mounting plane.

In conclusion, a single piece screwless cradle can be used to securely mount a hard drive directly to a printed circuit assembly. The single piece screwless cradle can be less expensive to manufacture and maintain in inventory than other multi-piece mounting designs. The cradle and drive assembly has a small footprint which allows for tighter spacing of adjoining components within a computing device and improved airflow through the computing device. The direct connection of the drive to the printed circuit assembly eliminates cabling and its associated cost and space demands. The arm latching onto the opposite side of the printed circuit assembly efficiently uses the space under the hard drive to secure the hard drive to the printed circuit assembly.

Removal of the hard drive from the printed circuit assembly is also accomplished without tools. As discussed above, the finger release tab disengages the hook and allows the hard drive to be uncoupled from the board mounted electrical connector. This tool-less installation and removal of the hard drive allows the procedure to be performed by users without additional equipment or training.

The preceding description has been presented only to illustrate and describe examples of the principles described. This description is not intended to be exhaustive or to limit these principles to any precise form disclosed. Many modifications and variations are possible in light of the above teaching.

What is claimed is:

1. A mounting device comprising a single piece screwless cradle for mounting an electronic storage device to a mounting plane, in which the single piece screwless cradle comprises:
   two rails joined at first ends by a crossbar, in which the two rails extend across a first side of the mounting plane;
   an arm extending from the crossbar;
   a hook extending upward from the arm, in which:
      the arm and hook extend through a first aperture on the mounting plane and are disposed on a second side of the mounting plane, the second side being opposite of the first side; and
      the hook engages a second aperture on the mounting plane; and
   engagement features on the rails for engaging receptive features on the electronic storage device.

2. The device of claim 1, in which the engagement features comprise pins to engage threaded holes of the receptive features.

3. The device of claim 2, in which the pins are configured to engage the threaded holes using a finger press fit.

4. The device of claim 2, in which the pins comprise long pins disposed by second ends of the rails and short pins disposed by the crossbar.

5. The device of claim 1, in which the single piece screwless cradle is configured to surround a hard drive on three sides, and in which the single piece screwless cradle is configured to expose an electrical connector on a fourth side of the hard drive.

6. The device of claim 1, in which the cradle is configured to slide over the mounting plane with the rails on the first side of the mounting plane and the arm on the second side of the mounting plane.

7. The device of claim 1, in which the arm further comprises a finger release tab for manually extracting the hook from the second aperture in the mounting plane.

8. The device of claim 1, in which the cradle further comprises a finger release tab flexurally connected to the crossbar and extending above the crossbar such that manual pressure on the finger release tab moves the hook out of the second aperture.

9. The device of claim 1, in which the cradle further comprises a finger release tab flexurally connected to a reduced cross section portion of the crossbar such that manual pressure on the finger release tab torsionally deforms the reduced cross section portions of the cradle to move the hook out of the second aperture.

10. The device of claim 9, in which the cradle further comprises a plurality of ribs on the arm and finger release tab.

11. The device of claim 1, further comprising retention tabs on upper edges of the rails.

12. The device of claim 1, in which the arm terminates in a finger release tab.

13. The device of claim 1, in which the first aperture is a slot.

14. A cradle for mounting an electronic storage device comprising:
   a "U" shaped frame disposed on a first surface of a mounting plane;
   pins on the "U" shaped frame for engaging threaded holes on the electronic storage device, in which the pins comprise long pins disposed by first ends of side rails of the "U" shaped frame and short pins disposed by a crossbar of the "U" shaped frame;
   an arm extending from the crossbar of the "U" shaped frame; and
   a hook extending upward from the arm, in which:
      the arm and hook extend through a first aperture on the mounting plane and are disposed on an opposing second surface of the mounting plane and engage the opposing second surface of the mounting plane; and
      the hook engages a second aperture on the mounting plane.

15. A method for tool-less installation of an electronic storage device comprising:
   placing an electronic storage device into a single piece screwless cradle;
   pressing engagement features of the cradle into receptive features of the electronic storage device to join the cradle to the electronic storage device;
   passing an arm of the cradle through a first aperture on a mounting plane;
   sliding the cradle and electronic storage device over the mounting plane such that the electronic storage device is disposed on a first surface of the mounting plane and the arm and a hook that extends upward from the arm are disposed on an opposite second surface of the mounting plane; and
   engaging the hook that extends upward from the arm with a second aperture on the mounting plane;
   in which the mounting plane is a printed circuit board.

16. The method of claim 15, further comprising:
   releasing the cradle from the mounting plane by:
      depressing a finger release tab extending above the electronic storage device, the finger release tab rotating to disengage the hook on the arm from the second aperture on the mounting plane; and
      sliding the electronic storage device and cradle away from the mounting plane.

17. The method of claim 15, wherein the arm terminates in a finger release tab.

18. The method of claim 15, wherein the first aperture is a slot.

* * * * *